3,222,366
1,2-MALONYL-1,2-DIHYDROCINNOLINE DERIVATIVES AND PROCESS FOR PREPARATION THEREOF
Theodor Wagner-Jauregg, Franz Schatz, and Ulrich Jahn, all of Zofingen, Switzerland, assignors to Siegfried Aktiengesellschaft, Zofingen, Switzerland, a corporation of Switzerland
No Drawing. Filed Feb. 19, 1964, Ser. No. 345,842
Claims priority, application Switzerland, Feb. 26, 1963, 2,424/63
8 Claims. (Cl. 260—250)

The present invention relates to novel 1,2-malonyl-1,2-dihydrocinnoline derivatives and to processes for their manufacture. The invention is particularly directed to compounds having the formula

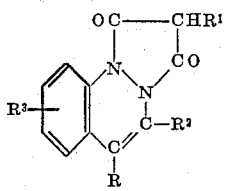

and its tautomeric forms, wherein R is a member selected from the group consisting of lower alkyl, phenyl, lower alkyl phenyl, and lower alkoxy phenyl, $R^1$ is a member selected from the group consisting of hydrogen, lower alkyl, cyclohexyl, cyclopentyl, lower alkanoyl, and phenyl, $R^2$ is a member selected from the group consisting of hydrogen and lower alkyl, and $R^3$ is a member selected from the group consisting of hydrogen and halogen; and their pharmaceutically acceptable alkali metal and amine salts.

The compounds of this invention can be prepared by reacting, preferably in the presence of an acid binding agent or a condensation agent, an unsubstituted or monosubstituted derivative of the malonic acid having the formula

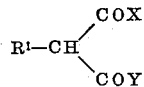

wherein $R^1$ has the same meaning as stated above and wherein X and Y are the same or are different and each represents a radical split off under reaction conditions as is e.g. halogen (acyl halides), hydroxyl (free carboxylic acid), alkoxy (esters), amino (amides) and azido (acid azides); with a compound having the formula

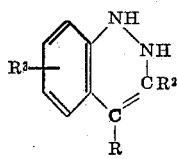

wherein R, $R^2$ and $R^3$ again have the same meaning as stated above, to effect a condensation with ring closure, followed optionally by conversion of the thus obtained compound by conventional methods to its salt.

If the malonyl derivative of the Formula II used as starting material has an unsubstituted methylene link between its carboxylic groups (i.e. $R^1$=H), a radical $R^1$ different from hydrogen may be introduced if desired into that position even after the five membered heterocyclic ring has been formed.

The process of the invention is preferably carried out by reacting a 4-alkyl-1,2-dihydrocinnoline of formula III with a malonic acid halide, e.g. the dichloride, in a solvent inert to the acid halide as is ether or benzene, and advantageously by passing a stream of nitrogen or another inert gas, in the presence or without a tertiary organic base as triethylamine, pyridine or dimethylaniline. The reaction can be effected at a low temperature close to 0° C., or by heating.

Another modification of the process is to heat a dialkyl ester, as e.g. the diethyl ester of a monosubstituted malonic acid, together with a 4-alkyl-1,2-dihydrocinnoline of Formula III in the presence of a suitable condensation agent, the cyclisation being effected by splitting off two moles of the corresponding alcohol, which is preferably removed in vacuo at a temperature between 100° C.–200° C.

Suitable condensation agents are compounds which can metallate a reactive hydrogen atom, as for example alcali metal or a reactive metal organic compound (e.g. sodium, potassium and their alcoholates, sodium amide, lithium hydride, butyl lithium and others).

If an unsymmetric malonic acid derivative of the Formula II is used as a starting compound, the cyclising condensation may be effected by separate steps. Thus, an ester chloride, as ClCO—CH($R^1$)COO-alkyl, can be reacted, preferably in an inert solvent and in the presence of a tertiary base, with an equimolecular amount of a 4-alkyl-1,2-dihydrocinnoline III, this first step resulting in the condensation of the acid chloride part of the ester chloride with the said dihydrocinnoline compound whereupon the cyclisation is completed by heating the thus obtained product in the presence of a sodium alcoholate.

A further modification of the process is to react a 1,2-dihydrocinnoline of the Formula III with a malonic acid derivative having an unsubstituted methylene group, for instance by heating in the presence of a metal alcoholate such as sodium ethylate, to obtain by that first step a compound of the formula

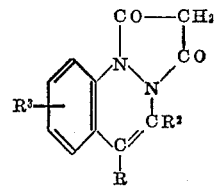

in which the substituent $R^1$ is introduced by a following step comprising the reaction of compound IV or one of its metallic salts, preferably in the presence of an acid binding agent and generally at a temperature of between 0° C. and 100° C., with a compound having the formula $R^1Z$ wherein Z is chlorine, bromine, iodine, $SO_4R^1$ or an aryl sulfonate.

A radical $R^1$ different from hydrogen can also be introduced by condensation of a compound having the Formula IV with a carbonylic compound of the formula $R^5$=O ($R^5$ being equal to $R^1$ minus one hydrogen atom at the α-position) so as to form a compound having the formula

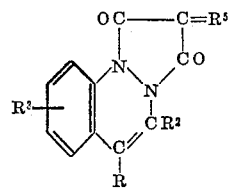

which is hydrogenated to give a compound having the Formula I.

In some cases it is possible to hydrogenate a compound of the Formula IV in the presence of a carbonylic compound $R^5$=O to obtain the final product without previous isolation of the intermediate product V.

Hydrogenation can be effected in both cases preferably with hydrogen in the presence of a hydrogenation catalyser as Raney nickel, finely dispersed nickel, platinum or palladium. This process is especially useful to prepare the compounds of Formula I, where the substituent $R^1$ has no aliphatic double linkage.

The compounds (I) of this invention form salts with basic substances. Most of their alkali metal salts and many of the salts with organic bases are soluble in water. To prepare these salts the substances of Formula I are treated with an equimolecular amount or with a lack or an excess of the base dissolved in water or alcohol. An excess of the compound I is filtered off, whereas an excess of the base is bound by additional compound I. To recover the salts in solid form, the solutions are evaporated, eventually in vacuo, or the salt can be separated by addition of an agent in which it is insoluble, for instance of an aqueous solution with acetone or an alcoholic solution with ether.

The 1,2-malonyl-1,2-dihydrocinnoline and its salts as described in this invention are thereapeutics which can be used as antiinflammatorics, analgetics and antipyretics; the salts with non toxic cations as sodium, magnesium, ethylendiamine, triethanolamine, trimethylamine, cyclohexylamine etc. being suitable for injection purposes.

In the following table are compared some substances of the present invention with the well-known antirheumatic, phenylbutazon, as to their effect on the rat-paw caolin edema. All already known antirheumatics exhibit on this model an antiphlogistic effect, also by peroral application (see investigations of Wagner-Jauregg, Jahn and Büch, Arzneimittel Fschg. 12, 1160 (1962).

In the following examples all melting points are determined in the Kofler apparatus.

EXAMPLE 1

*1,2-n-butylmalonyl-4-phenyl-1,2-dihydrocinnoline*

0.06 mol of 4-phenyl-1,2-dihydrocinnoline (available by the method described in Ber. Deutsch. chem. Ges. 42, 3115 and Liebigs Ann. 471, 113) are dissolved in an atmosphere of nitrogen while stirring in 100 ccm. absolute benzene. An equivalent amount of triethylamine and a 10% excess of butylmalonic acid dichloride are added dropwise to the stirred solution at room temperature while taking care that if possible the acid chloride slightly predominates. After addition, the stirring is continued for an hour at room temperature and for another hour at 60° C. while maintaining the nitrogen atmosphere. After 4 hours 98% of the calculated amount of triethylamine hydrochloride is separated. The benzene is evaporated under reduced pressure. The oily viscous residue is preferably distilled in high vacuum. Under a pressure of 0.1 mm. at a temperature of 190–195° C. it distills without decomposition. The glassy, light brown mass crystallizes from hot ethanol. Yield 65% of a crystalline yellowish product, melting at 158–60° C. and easily soluble in a dilute solution of an alkali.

*Analysis.*—Calcd. for $C_{21}H_{20}N_2O_2$ (332.4): C, 75.85; H, 6.07. Found: C, 75.78; H, 6.14.

| Subst. No. | Compounds of Formula I with substituents | | | | M.P. | $ID_{50}$ 50% inhibition (mg./kg. per os) | $DL_{50}$=medium lethal dose (mg./kg. per os) 14-days value | $ID_{50}/DL_{50}$ efficacy index |
|---|---|---|---|---|---|---|---|---|
| | R | $R^1$ | $R^2$ | $R^3$ | | | | |
| 178 | $CH_3$— | $C_6H_5$— | H | H | 212–213° C | 165 | 550 | 3.3 |
| 261 | $CH_3$— | Cyclopentyl— | H | H | 144° C | c. 500 | 1,000–1,500 | 2–3 |
| 200 | $C_2H_5$— | $C_6H_5$— | $CH_3$— | H | 208° C | 500 | c. 1,750 | c. 3.5 |
| 145 | $C_6H_5$— | $C_2H_5$— | H | H | 146–148° C | 175 | 570 | 3.3 |
| 139 | $C_6H_5$— | n-$C_3H_7$— | H | H | 164–166° C | 170 | <400 | <2.3 |
| 119 | $C_6H_5$— | i-$C_3H_7$— | H | H | 103° C | 140 | <500 | <3.6 |
| 87 | $C_6H_5$— | n-$C_4H_9$— | H | H | 158–160° C | 160 | 700 | 4.4 |
| 306 | $C_6H_5$— | n-$C_5H_{11}$— | H | H | 122–123° C | c. 250 | >2,000 | >8 |
| 123 | $C_6H_5$— | i-$C_5H_{11}$— | H | H | ($Kp_{0.1}$=190° C.) | 150 | 1,500 | 10 |
| 170 | p-$CH_3C_6H_4$— | n-$C_3H_7$— | H | H | 162–163° C | 130 | <<750 | <<5.8 |
| 287 | p-$CH_3C_6H_4$— | n-$C_4H_9$— | H | H | 142–143° C | 160 | 450 | 2.8 |
| 322 | p-$CH_3C_6H_4$— | n-$C_5H_{11}$— | H | H | 135–136° C | c. 500 | <1,000 | <2 |
| 300 | p-$CH_3C_6H_4$— | i-$C_5H_{11}$— | H | H | ($Kp_{0.65}$=220–225° C.) | 175 | <500 | <2.9 |
| 310 | p-$CH_3OC_6H_4$— | n-$C_4H_9$— | H | H | 148–149° C | >>500 | | |
| 330 | $C_6H_5$— | n-$C_4H_9$— | H | (6)-Cl | 143–144° C | 100 | c. 360 | c. 3.6 |
| 355 | p-$CH_3C_6H_4$— | n-$C_4H_9$— | H | (6)-Cl | 156° C | 130 | <400 | <3.1 |
| | | | | | | 190 | 780 | 4.1 |

Note.—Phenylbutazon as reference compound.

The comparison of the efficacy-indices (figures of the last column) shows that certain compounds of this invention are equal or superior to the phenylbutazon in their antiinflammatoric efficacy tested on the kaolin-rat-paw-edema.

The yeast-fever test on rats exhibits a similar result.

Comparison between phenylbutazon and substance No. 123 of this invention clearly exhibits favorable results for the latter, (see the following table), the values having been determined on female rats weighing 300 g. each, by treating them 8 times during 10 days with the substance 123.

EXAMPLE 2

*1,2-isopropylmalonyl-4-phenyl-1,2-dihydrocinnoline*

4-phenyl-1,2-dihydrocinnoline, isopropylmalonic acid dichloride and triethylamine are reacted in the same way as described before. The solution becomes a light brown color and the triethylamine hydrochloride begins to separate. Stirring is continued for 3 hours at room-temperature and for another hour at 60° C., while 95% of the theoretical amount of hydrochloride precipitates. From the reaction mixture, by the method described in

| Substance | Average loss of weight per animal g. | Death, percent per animal | Animals with ulcera, percent | Ulcus indices |
|---|---|---|---|---|
| 100 mg. phenylbutazon p.o | 38.2 | 0/10 | 67 | 2.9 |
| 100 mg. subst. No. 123 p.o | 13.7 | 1/10 | 22 | 0.3 |
| 100 mg. phenylbutazon i.m | 19.8 | 1/10 | 88 | 3.4 |
| 50 mg. subst. No. 123 i.m | 4.0 | 0/10 | 0 | 0 |

The ulcus-index shows an average-value including number and size of the ulcera.

the foregoing example, a product can be isolated which recrystallizes from ethanol. Yield: 63%. M.P. 103° C.

Analysis.—Calcd. for $C_{20}H_{18}O_2N_2$ (318.4): C, 75.43; H, 5.71. Found: C, 75.62; H, 5.73.

EXAMPLE 3

*1,2-isoamylmalonyl-4-phenyl-1,2-dihydrocinnoline*

After having reacted, as described before, 4-phenyl-1,2-dihydrocinnoline, triethylamine, and isoamylmalonic acid dichloride, 98% of the theoretical amount of triethylamine hydrochloride separates. After sucking off and evaporation of the benzene the residue is a dark, viscous oil, which can be distilled without decomposition at B.P. 190–95° C./0.1 mm.

Analysis.—Calcd. for $C_{22}H_{22}O_2N_2$ (346.4): C, 76.24; H, 6.41. Found: C, 76.52; H, 6.62.

The cyclohexylaminic salt of the composition is obtained in a crystalline form.

EXAMPLE 4

*1,2-propylmalonyl-4-phenyl-1,2-dihydrocinnoline*

(a) The product is obtained by an analogous method of preparation as described in the previous examples and recrystallized directly from ethanol/acetone. M.P. 163–166° C.

Analysis.—Calcd. for $C_{20}H_{18}O_2N_2$ (318.4): C, 75.44; H, 5.71; N, 8.81. Found: C, 75.40; H, 5.96; N, 8.86.

(b) 0.06 mole of 1,2-dihydro-4-phenylcinnoline and an equivalent amount of n-propylmalonic acid diethylester are dissolved in 70 ml. of a 1-molar solution of sodium alcoholate and after addition of 70 ml. xylene refluxed during 9½ hours while passing a stream of nitrogen, whereby the yellow sodium salt of the reaction product precipitates. After having poured on to grinded ice, the xylene is separated and the aqueous layer is acidified with 6n hydrochloric acid; the separated oily layer is dissolved in ether and dried over sodium sulphate. The viscous residue obtained after evaporation of the ether is crystallized from isopropanol or ether, the uncrystallizable residue is distilled in high vacuum. B.P. 190–195°/0.1 mm.; M.P. 164° C. Yield 40% of the theory.

EXAMPLE 5

*1,2-butylmalonyl-4-(p-tolyl)-1,2-dihydrocinnoline*

4-tolyl-1,2-dihydrocinnoline, butylmalonic acid dichloride and triethylamine are reacted in the same way as described in Example 1. The solution becomes a light brown color and the triethylamine hydrochloride begins to separate. Stirring is continued for 1½ hours at 60° C. and for 3 further hours at room-temperature, while 95% of the theoretical amount of hydrochloride precipitates. After sucking off the solvent, the crude product oil is dissolved in dilute sodium hydroxide, while heating slightly, and filtered on carbon. After acidification with hydrochloric acid the residue is filtered, and dissolved in ether. The insoluble part of the residue is dried by filtering and crystallized together with the crude oil after evaporation of the ether in ethanol. M.P. 142–143° C. Yield 60%.

Analysis.—Calcd. for $C_{22}H_{22}N_2O_2$ (346.4): C, 76.26; H, 6.40; N, 8.09. Found: C, 76.10; H, 6.48; N, 8.20.

EXAMPLE 6

*1,2-butylmalonyl-4-(p-tolyl)-6-chlor-1,2-dihydrocinnoline*

4-tolyl-1,2-dihydrocinnoline, butylmalonic acid dichloride and triethylamine are reacted as described in Example 1. The crude reaction product oil is several times extracted with diluted warm sodium hydroxide. The combined filtrates are acidified with hydrochloric acid. The product is recovered as described in Example 4. After crystallization from ethanol the yield is 50%. M.P. 156° C.

Analysis.—Calcd. for $C_{22}H_{21}N_2O_2Cl$ (380.0); C, 69.38; H, 5.56; N, 7.36. Found: C, 69.23; H, 5.58; N, 7.26.

EXAMPLE 7

*1,2-butyrylmalonyl-4-phenyl-1,2-dihydrocinnoline*

0.1 mole 1,2-dihydro-4-phenylcinnoline and the equivalent amount of malonic acid diethylester are dissolved in 50 ml. 1 mol/lt. sodium alcoholate solution. After addition of 150 ml. absolute toluene the alcohol is distilled fractionally at an oil-bath temperature of 110–120° C. and an inside temperature of 80–85° C. The aceotropic mixture is distilled off until the inside temperature has reached 110° C. The volume loss of toluene is completed. At an outside temperature of 145–150° C., while passing a stream of nitrogen, the reaction is allowed to continue for 24 hours. Then the product is poured on to grinded ice and stirred until completely dissolved. The organic layer is separated, and the aqueous layer acidified with 6 N hydrochloric acid. The yellow residue is filtered and washed with ether and crystallized from ethanol/dioxane. M.P. 264–268° C. The yield of 1,2-malonyl-4-phenyl-1,2-dihydrocinnoline is 79%.

Analysis.—Calcd. for $C_{17}H_{12}N_2O_2$ (276.28): C, 73.90; H, 4.38; N, 10.14. Found: C, 73.96; H, 4.44; N, 10.03. The obtained product is, while stirirng in an atmosphere of nitrogen, suspended in absolute chloroform, and 10 g. of pyridine are added. After some time the whole substance dissolves. Then, the equivalent amount of butyric acid chloride diluted in 30 ml. chloroform is added dropwise at room-temperature. During a period of 6 hours 95% of the pyridine hydrochloride separates. The mixture is poured on to grinded ice, the precipitate accumulated in the medium layer is collected, washed with benzene to remove all traces of water and then dried in vacuo. After crystallization from ethyl acetate the yield is 55%. M.P. 251° C.

Analysis.—Calcd. for $C_{21}H_{18}N_2O_3$ (346.4): C, 72.82; H, 5.24; N, 8.09. Found: C, 72.77; H, 5.23; N, 8.19.

We claim:

1. A compound selected from the group consisting of 1,2-malonyl-1,2-dihydrocinnoline derivatives having the formula

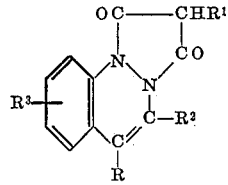

and its tautomeric forms, wherein R is a member selected from the group consisting of lower alkyl, phenyl, lower alkyl phenyl, and lower alkoxy phenyl, $R^1$ is a member selected from the group consisting of hydrogen, lower alkyl, cyclohexyl, cyclopentyl, lower alkanoyl, and phenyl, $R^2$ is a member selected from the group consisting of hydrogen and lower alkyl, and $R^3$ is a member selected from the group consisting of hydrogen and halogen; their pharmaceutically acceptable alkali metal salts; and their salts with an amine selected from the class consisting of ethylendiamine, triethanolamine, trimethylamine, and cyclohexylamine.

2. 1,2-n-butylmalonyl-4-phenyl-1,2-dihydrocinnoline.
3. 1,2-n-amylmalonyl-4-phenyl-1,2-dihydrocinnoline.
4. 1,2-iso-amylmalonyl-4-phenyl-1,2-dihydrocinnoline.
5. 1,2-n-butylmalonyl-4-phenyl-6-chloro-1,2-dihydrocinnoline.
6. 1,2-phenylmalonyl-3-methyl-4-ethyl-1,2-dihydrocinnoline.
7. 1,2-ethylmalonyl-4-phenyl-1,2-dihydrocinnoline.
8. 1,2-phenylmalonyl-4-methyl-1,2-dihydrocinnoline.

References Cited by the Examiner

UNITED STATES PATENTS 2,889,324  6/1959  Pfister et al. _____ 260—250
2,889,325  6/1959  Pfister et al. _____ 260—250

NICHOLAS S. RIZZO, *Primary Examiner.*